United States Patent [19]

Penzien

[11] Patent Number: 4,502,041
[45] Date of Patent: Feb. 26, 1985

[54] STRUCTURE FAILURE DETECTOR WITH SIGNAL TRANSMISSION THROUGH THE STRUCTURE ITSELF

[75] Inventor: Joseph Penzien, Lafayette, Calif.

[73] Assignee: The Regents of the University of California, Berkeley, Calif.

[21] Appl. No.: 373,967

[22] Filed: May 3, 1982

[51] Int. Cl.³ .......................... G08B 1/00; G01F 23/00
[52] U.S. Cl. .................... 340/532; 340/531; 340/605; 340/612; 340/621; 340/566; 340/683; 310/311; 310/337; 116/109; 181/106; 181/110; 73/290 V; 367/82
[58] Field of Search ............... 340/532, 601, 602, 592, 340/591, 603, 604, 605, 611, 612, 614, 621, 566, 683, 665, 679; 116/109; 181/0.5, 105, 108, 106, 110, 111, 112, 113, 118, 119, 120; 73/40, 40.5 R, 40.5 A, 41.2, 46, 49.1; 310/311, 314, 318, 320, 321, 337

[56] References Cited

U.S. PATENT DOCUMENTS

| | | | |
|---|---|---|---|
| 3,706,981 | 12/1972 | Hart | 340/621 |
| 4,090,193 | 5/1978 | Hinkle, Jr. | 340/605 |
| 4,329,875 | 5/1982 | Nolting et al. | 340/621 |

*Primary Examiner*—Donnie L. Crosland
*Attorney, Agent, or Firm*—Lothrop & West

[57] ABSTRACT

An offshore drilling tower has at least one upright hollow member extending from below the water to support an above-water platform. A detector in or on the hollow member, usually below the water, responds to a water leak into the hollow member. The detector includes a signal generator responsive to pressure or chemical effect of the water. The detector is effective when actuated by water intrusion into the hollow member and into contact with the detector to send a signal of a unique or distinct frequency through the member itself to a signal receiver, preferably on the platform. The receiver is tuned to the distinct frequency and is effective upon receipt of such signal to afford an indication that the detector has been actuated by a water leak at a particular location. Variously tuned signal generators can be located within and without the tower on different ones of the hollow members, so that each, when energized, actuates a comparably tuned receiver on the platform, thus affording unique indications of various leak locations.

3 Claims, 3 Drawing Figures

STRUCTURE FAILURE DETECTOR WITH SIGNAL TRANSMISSION THROUGH THE STRUCTURE ITSELF

BRIEF SUMMARY OF THE INVENTION

One or more signal generators responsive checmically or by pressure to the presence of water are installed in hollow, normally interiorly dry supporting or structural members of an offshore drilling tower. The signal generators are effective when water enters any of the members in contact with the particular signal generator to send a signal of a distinct or unique frequency through the material, usually metal, of the tower to the tower platform. A signal receiver on the platform indicates particular, distinct frequency and is effective, upon receiving such signal, to afford an indication, such as an audible or visual alarm, of the location of the energized signal generator; i.e. of the particular structure member bearing that signal generator.

PRIOR ART

Patents as follows and enclosed may be of interest:

| | | |
|---|---|---|
| 932,079 | 8/1909 | Williams |
| 2,229,036 | 1/1941 | Bird et al. |
| 3,028,450 | 4/1962 | Manning |
| 3,126,734 | 3/1964 | Stutzman |
| 3,483,736 | 12/1969 | Anderson |
| 3,572,085 | 3/1971 | Packo |
| 3,874,222 | 4/1975 | Ladd et al. |
| 3,930,556 | 1/1976 | Kusuda et al. |
| 4,021,773 | 5/1977 | Keenan |
| 4,051,714 | 10/1977 | Fechter et al. |
| 4,143,540 | 3/1979 | Peterson et al. |

They do not disclose an arrangement as claimed, in which a water detector, normally in a dry environment within a metallic tower support, is energized by the presence of water to send a unique vibratory signal through the support to an indicator or alarm device on a platform at the top of the tower.

DETAILED DESCRIPTION

Figure 1:
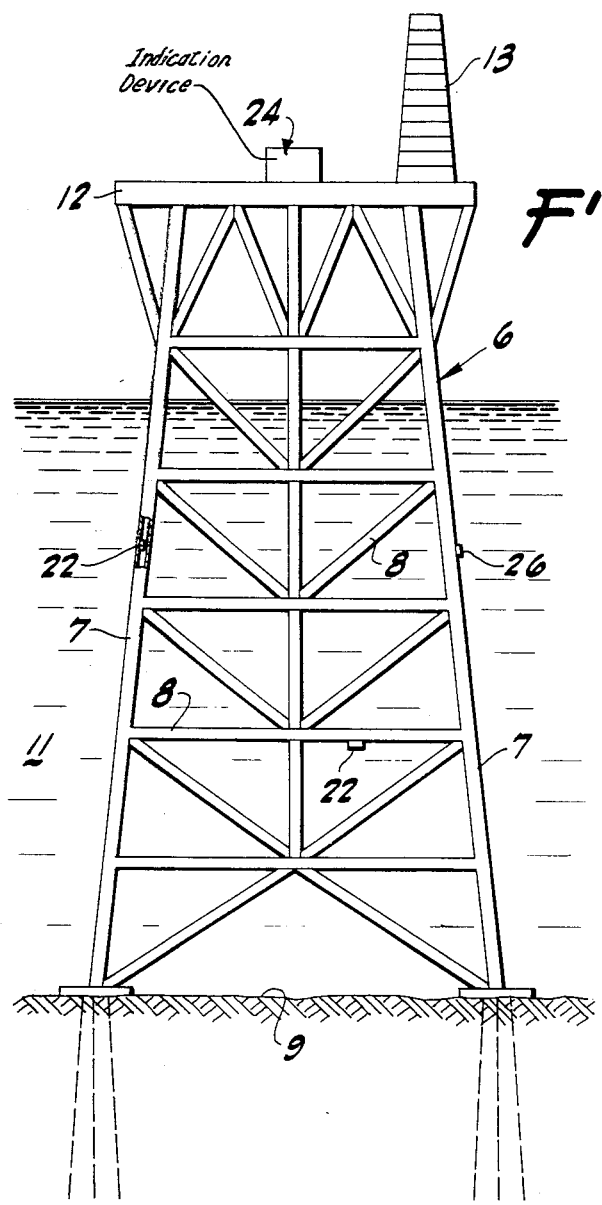
FIG. 1 is an elevational view of an offshore tower, such as a drilling tower, in position in the ocean and having a portion broken away to show one of the structural failure detectors of the invention installed thereon.

While the structural failure detector pursuant to the invention can be embodied in a number of different ways and can be installed in various different but comparable environments, it has found particular application in connection with an offshore tower 6 usually utilized for drilling. The tower is installed with hollow, metal members such as approximately upright legs 7 and transverse braces or beams 8. It is supported in the floor 9 of the ocean 11 and is for the most part submerged. The tubular shell or tower members support a deck 12 or drilling platform or the like having drilling equipment 13 thereon.

Figure 2:
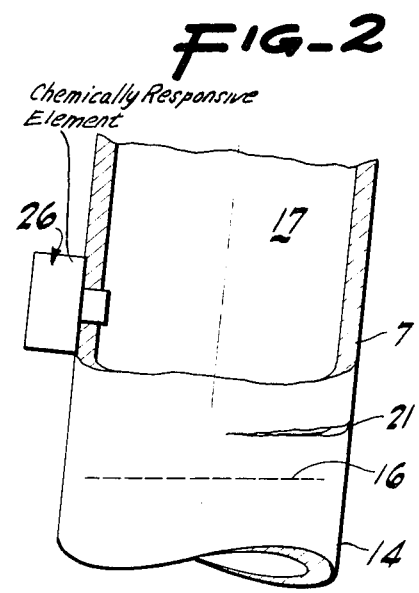
FIG. 2 is a side elevation, portions being broken away and portions being in cross-section, showing a submerged, hollow member forming part of the tower of FIG. 1 with part of a detector-signal generator installed thereon.
Figure 3:
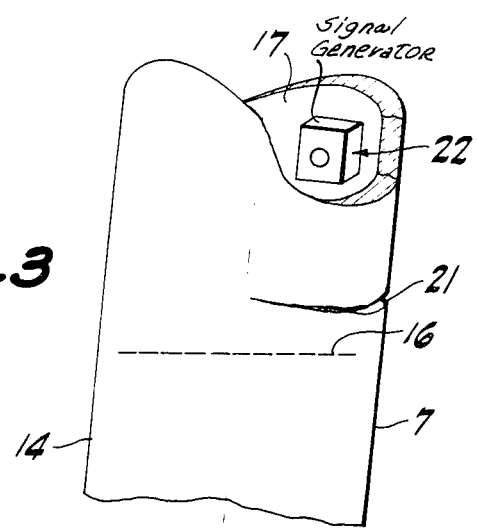
FIG. 3 is like FIG. 2 showing an interior installation of the detector-signal generator within a hollow tower member.

In the usual case, the tower is initially brought from shore to its point of installation with a generally horizontal attitude of the tubular support members 7. They are dry and air-filled. The tower is then tipped into active position with the support members 7 well sustained on the ocean floor and finally extending substantially vertically. Some portions of the support members 7 and of the interconnected braces 8 extend from below the surface of the ocean into the atmosphere around the elevated deck or platform 12. During the installation procedure, the hollow, previously dry or empty interior of the support members 7 and braces 8 is partially filled with ambient water in order to regulate the amount of buoyancy. After the tower has been installed for operation, some of the support members and braces may, as seen in FIGS. 2 and 3, have a portion 14 in which there may be a body 16 of ocean water and an upper portion 17 devoid of water and full of air.

There are various disturbing forces imposed upon the platform 12 not only from the action of the ocean 11 but also from action of local machinery, drilling equipment and otherwise. These forces impress vibrations on the tower structure generally within relatively low frequency ranges.

It sometimes occurs due to machinery vibrations or external forces or for various reasons that the material of the tubular members 7 and braces and beams 8 ruptures. The result is a fracture 21 that permits leakage of surrounding ocean water into the interior of the previously empty or dry tubular member or brace. In some instances the mere admission of some water or of additional water is not of great consequence, but it is always of great importance to detect the presence of the fracture 21, for that may lead to or be an indication of further failure.

Consequently, and in accordance with the invention, I particularly provide within or on one or more of the tubular members 7 or braces 8 one or more responsive signal generating devices 22 of a generally standard sort. Each is a high frequency vibratory element such as a piezo-electric crystal. Normally, when not pressured, this crystal dispenses no signal. But the crystal is effective, when actuated by pressure or deformation, to emit a signal of a relatively high, clear, distinct or unique frequency into or upon the material of the tubular members 7 or braces 8.

The responsive signal generator 22 is preferably one of two main versions. In one instance the responsive, signal generating device 22 is responsive to water pressure. With such a device, in the event of a fracture 21 below the ambient water level, the interior water level then rises and touches upon the adjacent responsive signal device. The signal generating device 22 responds by impressing a signal of a unique, preferably high frequency upon or into the material of the supporting tubular member or brace. Such signal travels easily through the connected metal members to the platform 12.

The signal received at the platform is effective upon an indication device 24 of a standard kind tuned particularly to the special or unique frequency of the signalling or actuating device 22 that has been triggered. There is thus afforded an appropriate indication, either visually or audibly, of the reception of the signal. This is preferably upon a visual chart showing the effective frequency as quite distinct from all of the other frequencies generated normally in the drilling equipment or attendant equipment. Thus the signal initiated by the abnormal water inflow at the fracture 21 in the member 8 promptly affords the drill tower operator a distinct warning and tells him that there is a fracture 21 in a particular one of the members 8, for example.

Another version of the signal device 22 is a chemically responsive element 26. The chemically responsive element is inactive when it is surrounded by air. If water enters a tubular member 7 or brace 8 by reason of a fracture, the water contacting the chemically responsive element 26 sets off or allows a chemical reaction. This reaction starts a signal from the chemically actuated element 26. This signal is transmitted from the element 26 through the brace or tubular member to the platform and to the indication device 24. The contacting water can act as an electrolyte to establish an otherwise absent electrochemical reaction effective to generate an electrical current signal.

Either the generator 22 or the generator 26 may be external. Before installation of the external generator, a hole is made through the wall of the tube, and the generator 22 or the generator 26 is installed over such hole, so as to respond to water inside the tube. After tower erection this installation can be done by a diver. A signal from the generator 26 is similarly carried through the tubular member 7 or brace 8 or both and also through the other parts of the tower to the platform 12 and to its individually responsive indication device 24. Different indications are afforded because of the differences in signal frequencies. The operator on the platform can determine immediately by the individually responsive one of the alarms 24 just where the fracture is.

In this way the standard drilling tower without the complication of extra wiring or special construction can readily be provided with water-leak responsive elements at any convenient locations in any of the tubular members or attendant braces and connectors either at locations accessible to normal means or in some instances at locations accessible only to divers. In this way the presence of a crack or fracture or opening of any sort which admits extra water is effective to afford a distinctive signal of the particular location thereof to the operator.

I claim:

1. A structural failure detector especially for an offshore tower wherein a platform having well-servicing machinery transmitting vibrations at frequencies associated with said servicing machinery is supported on a hollow frame extending beneath the water comprising a signal generator adapted to generate a signal having a frequency distinct from said frequencies associated with said servicing machinery and to transmit said signal at said distinct frequency through said hollow frame to said platform, means connected to said hollow frame and effective to activate said signal generator to generate a signal at said distinct frequency in response to leakage of water into said hollow frame, and means on said platform for receiving from and through said hollow frame said signal having said distinct frequency and for indicating receipt of said signal having said distinct frequency.

2. Mechanism as in claim 1 having several individual ones of said signal generators, each of said signal generators having a frequency distinct from the frequency of others of said signal generators and distinct from said frequencies associated with said servicing machinery, and means at said platform for responding to said several distinct frequencies only.

3. A structural failure detector for use with a drilling platform supported on a hollow leg extending beneath the water and having servicing machinery on said platform adapted to transmit vibrations at first predetermined frequencies through the material of said hollow leg comprising means on said leg activated by water in said hollow leg for generating vibrations at second predetermined frequencies different from said first predetermined frequencies and transmitting said vibrations at said second predetermined frequencies through the material of said hollow leg to said platform, and means on said platform for selectively receiving and indicating the receipt of said vibrations at only said second predetermined frequencies.

* * * * *